United States Patent
Poupa Parsigneau et al.

(10) Patent No.: US 9,931,819 B2
(45) Date of Patent: Apr. 3, 2018

(54) VACUUM INSULATION PANEL COMPRISING AN ORGANIC AEROGEL

(71) Applicant: HUTCHINSON, Paris (FR)

(72) Inventors: Nadine Poupa Parsigneau, Dordives (FR); Benjamin Swoboda, Bois le Roi (FR); Cedric Huillet, Montargis (FR); Christophe Dominiak, Varennes Changy (FR)

(73) Assignee: HUTCHINSON, Paris (FR)

( * ) Notice: Subject to any disclaimer, the term of this patent is extended or adjusted under 35 U.S.C. 154(b) by 39 days.

(21) Appl. No.: 15/118,346

(22) PCT Filed: Feb. 12, 2014

(86) PCT No.: PCT/FR2014/050267
§ 371 (c)(1),
(2) Date: Aug. 11, 2016

(87) PCT Pub. No.: WO2015/121540
PCT Pub. Date: Aug. 20, 2015

(65) Prior Publication Data
US 2017/0165946 A1    Jun. 15, 2017

(51) Int. Cl.
*F16L 59/065* (2006.01)
*B32B 27/06* (2006.01)
(Continued)

(52) U.S. Cl.
CPC .............. *B32B 27/065* (2013.01); *B32B 5/18* (2013.01); *B32B 15/082* (2013.01);
(Continued)

(58) Field of Classification Search
CPC ..... Y10T 428/231; F16L 59/065; E04B 1/803
See application file for complete search history.

(56) References Cited

U.S. PATENT DOCUMENTS

| 2004/0180176 A1 | 9/2004 | Rusek, Jr. |
| 2012/0009376 A1 | 1/2012 | Rusek, Jr. |
| 2013/0260078 A1 | 10/2013 | Kim et al. |

FOREIGN PATENT DOCUMENTS

| EP | 1 457 612 A1 | 9/2004 |
| EP | 2 657 278 A2 | 10/2013 |

(Continued)

OTHER PUBLICATIONS

International Search Report dated Oct. 31, 2014 in PCT/FR2014/050267 (with English language translation).
(Continued)

*Primary Examiner* — Alexander Thomas
(74) *Attorney, Agent, or Firm* — Oblon, McClelland, Maier & Neustadt, L.L.P.

(57) ABSTRACT

The present invention relates to a vacuum insulation board (1) comprising:
  a hermetically closed covering (3) in which the pressure is lower than atmospheric pressure,
  a core material (5) made of organic aerogel placed inside said covering (3),
said organic aerogel being based on a resin resulting at least in part from polyhydroxybenzene(s) R and formaldehyde(s) F,
said organic aerogel being a polymeric monolithic organic gel comprising at least one water-soluble cationic polyelectrolyte,
or said organic aerogel being a pyrolysate of said gel in the form of a porous carbon monolith comprising the product of the pyrolysis of said at least one water-soluble cationic polyelectrolyte P,
said organic aerogel exhibiting a specific thermal conductivity of between 10 and 40 $mW \cdot m^{-1} \cdot K^{-1}$ at atmospheric pressure.

21 Claims, 2 Drawing Sheets

Figure 1:
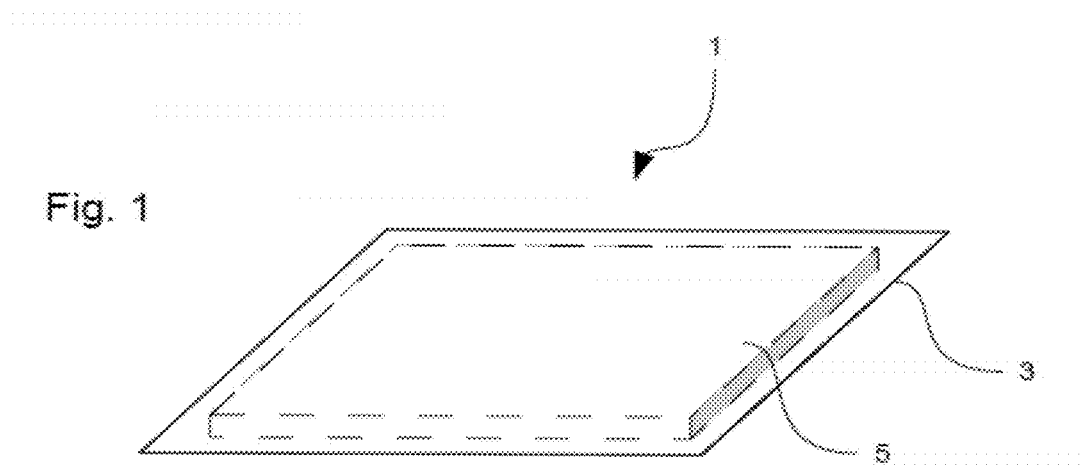

(51) Int. Cl.
| | |
|---|---|
| B32B 15/085 | (2006.01) |
| B32B 15/09 | (2006.01) |
| B32B 15/20 | (2006.01) |
| B32B 5/18 | (2006.01) |
| B32B 15/082 | (2006.01) |
| B32B 27/28 | (2006.01) |
| B32B 27/30 | (2006.01) |
| B32B 27/32 | (2006.01) |
| B32B 27/34 | (2006.01) |
| B32B 27/36 | (2006.01) |
| B32B 27/40 | (2006.01) |
| B32B 37/10 | (2006.01) |
| B32B 37/18 | (2006.01) |
| C08J 3/075 | (2006.01) |
| C08J 9/28 | (2006.01) |
| C01B 32/30 | (2017.01) |
| E04B 1/80 | (2006.01) |

(52) U.S. Cl.
CPC ............ *B32B 15/085* (2013.01); *B32B 15/09* (2013.01); *B32B 15/20* (2013.01); *B32B 27/283* (2013.01); *B32B 27/30* (2013.01); *B32B 27/308* (2013.01); *B32B 27/32* (2013.01); *B32B 27/34* (2013.01); *B32B 27/36* (2013.01); *B32B 27/40* (2013.01); *B32B 37/1018* (2013.01); *B32B 37/182* (2013.01); *C01B 32/30* (2017.08); *C08J 3/075* (2013.01); *C08J 9/286* (2013.01); *B32B 2266/04* (2013.01); *B32B 2266/126* (2016.11); *B32B 2305/026* (2013.01); *B32B 2307/304* (2013.01); *B32B 2309/68* (2013.01); *B32B 2311/24* (2013.01); *B32B 2323/043* (2013.01); *B32B 2323/046* (2013.01); *B32B 2329/04* (2013.01); *B32B 2367/00* (2013.01); *B32B 2375/00* (2013.01); *B32B 2377/00* (2013.01); *B32B 2383/00* (2013.01); *B32B 2607/00* (2013.01); *C08J 2361/12* (2013.01); *E04B 1/803* (2013.01); *Y02B 80/14* (2013.01)

(56) References Cited

FOREIGN PATENT DOCUMENTS

| | | |
|---|---|---|
| WO | WO 2014/060904 A1 | 4/2014 |
| WO | WO 2014/060906 A1 | 4/2014 |

OTHER PUBLICATIONS

R.W. Pekala, et al. "New organic aerogels based upon a phenolic-furfural reaction" Journal of Non-Crystalline Solids, vol. 188, XP004067973, 1995, pp. 34-40.

VACUUM INSULATION PANEL COMPRISING AN ORGANIC AEROGEL

The present invention relates to the field of thermal insulation and more particularly to low thermal conductivity vacuum insulation boards comprising a core material made of organic aerogel.

In the field of thermal insulation, it is known to use vacuum insulation boards, for example in the building field, in order to insulate a house. Generally, these vacuum insulation boards comprise a hermetically closed covering in which a vacuum is created and into which a core material is inserted.

The core material used within the vacuum insulation boards is a low thermal conductivity insulation material, such as, for example, glass wool, or else a microporous insulation material, such as a silica gel. The vacuum within the vacuum insulation board makes it possible to further decrease in proportion the thermal conductivity of the latter by the rarefaction of the air within the micropores of the core material.

Nevertheless, in order to achieve thermal conductivity values of between 1 and 20 $mW \cdot m^{-1} \cdot K^{-1}$, it is necessary to achieve extremely low pressures within the covering. Such a low pressure level within the covering results in high stresses on the coverings and the latter can, as a result of microleakages, have an internal pressure which rises again and thus have a thermal conductivity which increases. This solution is thus not permanent over time.

A known solution to this technical problem is the use as core material of a nanoporous insulation material of monolithic aerogel type, as shown in the international application WO2007001354A2. An insulation board as presented in this international application can have a thermal conductivity value of between 5 and 10 $mW \cdot m^{-1} \cdot K^{-1}$ for a pressure within the covering of the order of 0.4 to 10 mbar.

However, the aerogels used in the prior art are aerogels having a high production cost and which are difficult to manufacture as they require a stage of drying with supercritical $CO_2$ which is lengthy and expensive.

One of the aims of the present invention is thus to at least partially overcome the disadvantages of the prior art and to provide a vacuum insulation board comprising a core material made of aerogel, having a low cost price, the thermal conductivity of which is between 1 and 20 $mW \cdot m^{-1} \cdot K^{-1}$.

The present invention thus relates to a vacuum insulation board comprising:
  a hermetically closed covering in which the pressure is lower than atmospheric pressure,
  a core material made of organic aerogel placed inside said covering,
said organic aerogel being based on a resin resulting at least in part from polyhydroxybenzene(s) R and formaldehyde(s) F,
said organic aerogel being a polymeric monolithic organic gel comprising at least one water-soluble cationic polyelectrolyte,
or said organic aerogel being a pyrolysate of said gel in the form of a porous carbon monolith comprising the product of the pyrolysis of said at least one water-soluble cationic polyelectrolyte P,
said organic aerogel exhibiting a specific thermal conductivity of between 10 and 40 $mW \cdot m^{-1} \cdot K^{-1}$ at atmospheric pressure.

According to one aspect of the invention, the at least one water-soluble cationic polyelectrolyte P is an organic polymer chosen from the group consisting of quaternary ammonium salts, poly(vinylpyridinium chloride), polyethyleneimine, polyvinylpyridine, poly(allylamine hydrochloride), poly(trimethylammonioethyl methacrylate chloride), poly(acrylamide-co-dimethylammonium chloride) and their mixtures.

According to another aspect of the invention, the at least one water-soluble cationic polyelectrolyte P is a salt comprising units resulting from a quaternary ammonium chosen from poly(diallyldimethylammonium halide) and is preferably poly(diallyldimethylammonium chloride) or poly(diallyldimethylammonium bromide).

According to another aspect of the invention, the organic aerogel comprises the product of a polymerization reaction in an aqueous solvent W of the polyhydroxybenzene(s) R and formaldehyde(s) F, in the presence of the at least one water-soluble cationic polyelectrolyte P dissolved in said aqueous solvent and of a catalyst.

According to another aspect of the invention, the product of the polymerization reaction comprises said at least one water-soluble cationic polyelectrolyte P according to a mass fraction of between 0.2% and 2%.

According to another aspect of the invention, the product of the polymerization reaction comprises said at least one water-soluble cationic polyelectrolyte P according to a P/(R+F) ratio by weight, with respect to said polyhydroxybenzene(s) R and formaldehyde(s) F, which is between 2% and 10%.

According to another aspect of the invention, the product of the polymerization reaction comprises said at least one water-soluble cationic polyelectrolyte P according to a P/(R+F+W) ratio by weight, with respect to said polyhydroxybenzene(s) R, formaldehyde(s) F and aqueous solvent W, which is between 0.3% and 2%.

According to another aspect of the invention, the organic aerogel exhibits:
  a specific surface of between 400 $m^2/g$ and 1200 $m^2/g$, and/or
  a pore volume of between 0.1 $cm^3/g$ and 3 $cm^3/g$, and/or
  a mean pore diameter of between 3 nm and 30 nm, and/or
  a density of between 0.01 and 0.4.

According to another aspect of the invention, the pressure within the covering is between 0.1 and 500 mbar.

According to another aspect of the invention, the covering is produced from a film with a thickness of between 20 and 500 μm.

According to another aspect of the invention, the covering comprises at least one layer made of aluminum.

According to another aspect of the invention, the covering comprises at least one layer made of polymer.

According to another aspect of the invention, the at least one layer made of polymer is produced from one of the following polymers: high- or low-density polyethylene, silicone, polyurethane, ethylene/vinyl alcohol, polyethylene terephthalate or polyamide.

According to another aspect of the invention, the covering is produced from a multilayer film comprising at least one layer made of polymer material on its internal face.

According to another aspect of the invention, the multilayer film forming the covering comprises the following layers:
  polyethylene/polyacrylic/aluminum/polyethylene terephthalate, or
  polyethylene/aluminum/polyethylene terephthalate, or also
  polyethylene/aluminum/polyethylene/aluminum/polyethylene.

The present invention also relates to a process for the manufacture of a vacuum insulation board comprising the following stages:
preparation of an organic aerogel as core material according to the following stages:
a) polymerization in an aqueous solvent W of polyhydroxybenzene(s) R and formaldehyde(s) F, in the presence of at least one water-soluble cationic polyelectrolyte P dissolved in said aqueous solvent W and of a catalyst,
b) gelling of the solution obtained in a),
c) drying of the gel obtained in b) in order to obtain said polymeric monolithic organic gel,
placing said organic aerogel in a covering,
lowering the pressure within the covering and hermetically closing said covering.

According to one aspect of the preparation process according to the invention, the stage of preparation of the organic aerogel comprises an additional stage of pyrolysis of the dried gel obtained in c), in order to obtain a porous carbon.

According to another aspect of the preparation process according to the invention, stage a) is carried out by using said at least one water-soluble cationic polyelectrolyte P:
according to a mass fraction in the composition of between 0.2% and 2%, and/or
according to a P/(R+F) ratio by weight, with respect to said polyhydroxybenzene(s) R and formaldehyde(s) F, of between 2% and 10%, and/or
according to a P/(R+F+W) ratio by weight, with respect to said polyhydroxybenzene(s) R, formaldehyde(s) F and aqueous solvent W, of between 0.3% and 2%.

According to another aspect of the preparation process according to the invention:
stage a) is carried out at ambient temperature, by dissolving said polyhydroxybenzene(s) R and said at least one water-soluble cationic polyelectrolyte P in said aqueous solvent W, preferably composed of water, and by then adding, to the solution obtained, said formaldehyde(s) F and said acidic or basic catalyst, and
stage b) is carried out by curing said solution in an oven.

According to another aspect of the preparation process according to the invention, stage c) is carried out by drying with air, for example in a stove, in order to obtain said polymeric monolithic organic gel exhibiting:
a specific surface of between 400 m$^2$/g and 1200 m$^2$/g, and/or
a pore volume of between 0.1 cm$^3$/g and 3 cm$^3$/g, and/or
a mean pore diameter of between 3 nm and 30 nm, and/or
a density of between 0.01 and OA.

Figure 3:
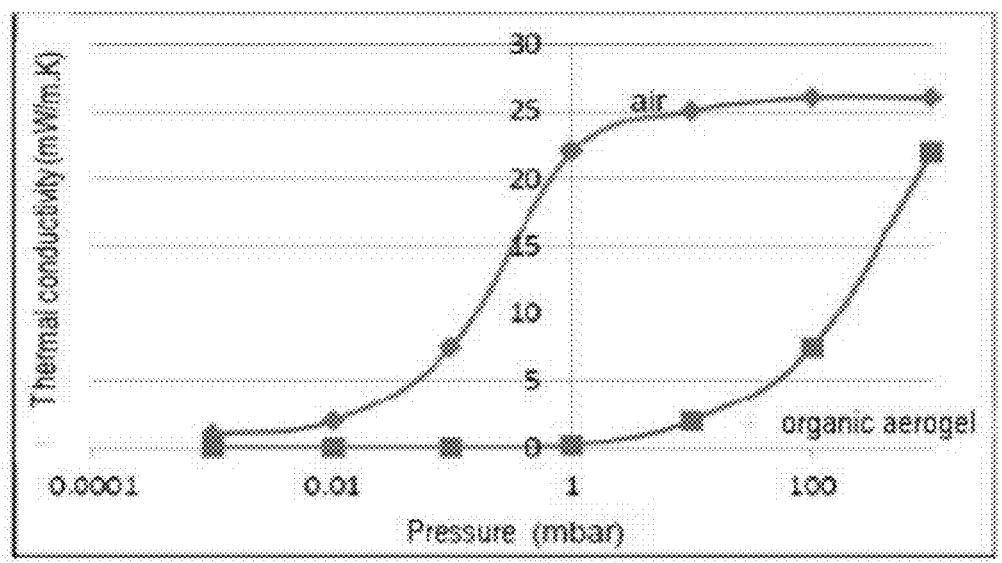
Figure 4:
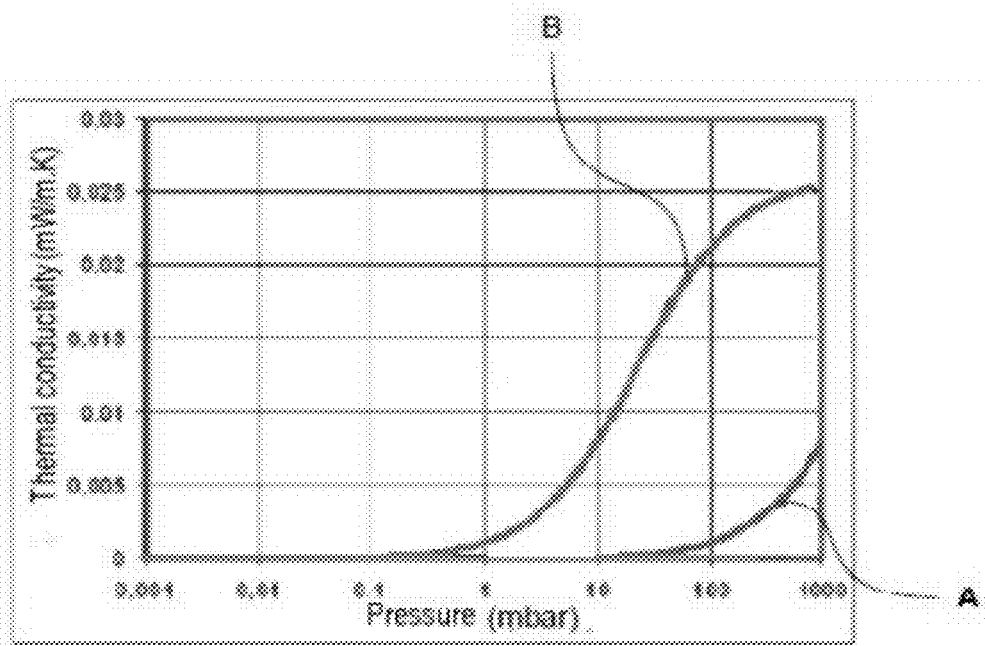

According to one aspect of the preparation process according to the invention, the closing of the covering is carried out by heat sealing Other characteristics and advantages of the invention will become more clearly apparent on reading the following description, given as illustrative and nonlimiting example, and the appended drawings, among which:
FIG. 1 shows a diagrammatic representation in perspective of a vacuum insulation board,
FIG. 2 shows a diagrammatic representation in cutaway view of a vacuum insulation board,
FIG. 3 shows a graph comparing the change in the thermal conductivity of the air and of an aerogel as a function of the pressure, and
FIG. 4 shows a graph comparing the change in the thermal conductivity of core materials of different porosities as a function of the pressure.

Identical components in the different figures carry the same references.

Figure 2:
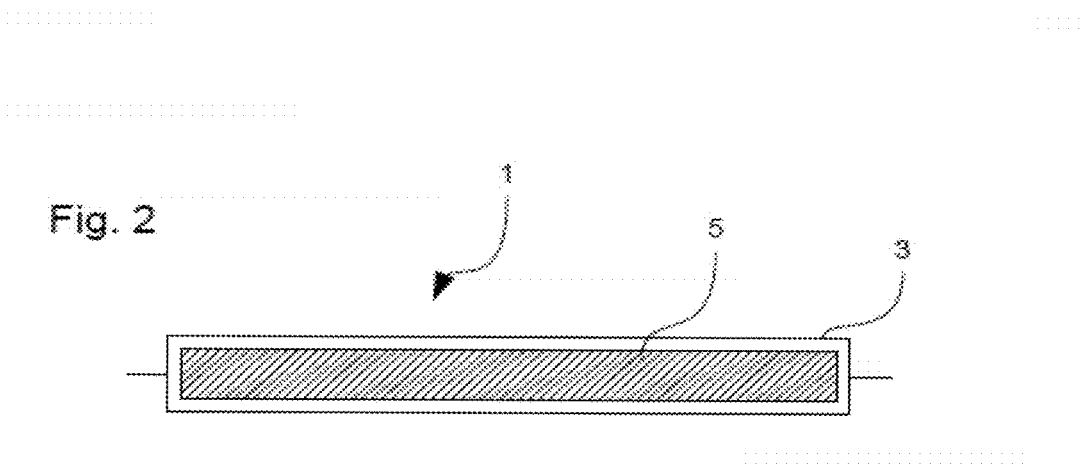

As shown in FIG. 1, showing in perspective a diagrammatic representation of an insulation board 1, and also in FIG. 2, showing a diagrammatic representation in cutaway of the insulation board 1 of FIG. 1, this board comprises a hermetically closed covering 3 in which the pressure is lower than atmospheric pressure. An insulating core material 5 made of organic aerogel material is placed inside said covering 3.

Said organic aerogel can in particular be a polymeric monolithic organic gel or a pyrolysate of said gel in the form of a thermal superinsulating porous carbon monolith (i.e., with a thermal conductivity of less than or equal to 40 mW·m$^{-1}$·K$^{-1}$).

The vacuum insulation board 1 is generally conditioned in the form of panels with a size and thickness which can vary as a function of the use for which it will be intended, for example for an application in thermal insulation in the offshore field or the construction industry. This size can, for example, be 300×300 mm for a thickness of 2 to 30 mm.

This organic aerogel is obtained by the fact that the applicant company has just discovered, surprisingly, that the addition in the aqueous phase, to precursors of a resin of polyhydroxybenzene and of formaldehyde type, of a specific family of additives consisting of a water-soluble cationic polyelectrolyte makes it possible to obtain a monolithic gel or its pyrolysate which simultaneously exhibits a high specific surface, a very low density and a high pore volume, while being able to manage without drying by solvent exchange and by a supercritical fluid.

To this end, the organic aerogel is based on a resin resulting at least in part from polyhydroxybenzene(s) R and from formaldehyde(s) F, is such that it comprises at least one water-soluble cationic polyelectrolyte P.

It should be noted that this aerogel incorporating this cationic polyelectrolyte can advantageously be obtained by using a stove drying which is much simpler to carry out and which is less damaging to the cost of production of the gel than drying by supercritical $CO_2$. This is because the applicant company has discovered that this additive makes it possible to retain the high porosity of the gel obtained subsequent to this stove drying and to confer on it a very low density combined with a high specific surface and a high pore volume.

The term "gel" is understood to mean, in a known way, the mixture of a colloidal material and of a liquid which is formed spontaneously or under the action of a catalyst by the flocculation and coagulation of a colloidal solution.

The term "water-soluble polymer" is understood to mean a polymer which can be dissolved in water without addition of additives (in particular of surfactants), unlike a water-dispersible polymer which is capable of forming a dispersion when it is mixed with water.

The organic aerogel can also comprise the product of a polymerization reaction in an aqueous solvent W of said polyhydroxybenzene(s) R and formaldehyde(s) F, in the presence of said at least one cationic polyelectrolyte P dissolved in this solvent and of an acidic or basic catalyst.

Advantageously, said product of the polymerization reaction can comprise:
said at least one cationic polyelectrolyte P according to a greatly reduced mass fraction which is between 0.2% and 2% and preferably between 0.3% and 1%, and/or
said at least one cationic polyelectrolyte P according to a P/(R+F) ratio by weight, with respect to said polyhydroxybenzene(s) R and formaldehyde(s) F, which is between 2% and 10% and preferably between 3% and 7%, and/or said at least one cationic polyelectrolyte P according to a P/(R+F+W) ratio by weight, with respect to said polyhydroxybenzene(s) R, formaldehyde(s) F and aqueous solvent W, which is between 0.3% and 2% and preferably between 0.4% and 1.5%.

Said at least one polyelectrolyte can be any cationic polyelectrolyte which is completely soluble in water and with a low ionic strength.

Preferably, it is an organic polymer chosen from the group consisting of quaternary ammonium salts, poly(vinylpyridinium chloride), polyethyleneimine, polyvinylpyridine, poly(allylamine hydrochloride), poly(trimethylammonioethyl methacrylate chloride), poly(acrylamide-co-dimethylammonium chloride) and their mixtures.

More preferably still, said at least one water-soluble cationic polyelectrolyte is a salt comprising units resulting from a quaternary ammonium chosen from poly(diallyldimethylammonium halide) and is preferably poly(diallyldimethylammonium chloride) or poly(diallyldimethylammonium bromide).

Mention may be made, among the precursor polymers of said resin which can be used in the present invention, of the polymers resulting from the polycondensation of at least one monomer of the polyhydroxybenzene type and of at least one formaldehyde monomer. This polymerization reaction can involve more than two distinct monomers, the additional monomers being or not being of the polyhydroxybenzene type. The polyhydroxybenzenes which can be used are preferably di- or trihydroxybenzenes and advantageously resorcinol (1,3-dihydroxybenzene) or the mixture of resorcinol with another compound chosen from catechol, hydroquinone or phloroglucinol.

The polyhydroxybenzene(s) R and formaldehyde(s) F may be used, for example, according to an R/F molar ratio of between 0.2 and 1.

The organic aerogel can advantageously exhibit a specific surface of between 400 m$^2$/g and 1200 m$^2$/g, and/or a pore volume of between 0.1 cm$^3$/g and 3 cm$^3$/g, and/or a mean pore diameter of between 3 nm and 30 nm, and/or a density of between 0.01 and 0.4.

Advantageously, the organic aerogel can exhibit a thermal conductivity of between 10 mW·m$^{-1}$·K$^{-1}$ and 40 mW·m$^{-1}$·K$^{-1}$ and for example of between 12 and 35 mW·m$^{-1}$·K$^{-1}$ at atmospheric pressure.

For its part, the covering 3 is produced from a mono- or multilayer film with a thickness of between 20 and 500 μm, preferably of the order of 100 μm. This low thickness makes it possible to limit the increase in the thermal conductivity of the vacuum insulation board 1 by the addition of this covering 3.

The film preferably comprises at least one layer made of aluminum or of polymer, for example chosen from high- or low-density polyethylene, silicone, polyurethane, ethylene/vinyl alcohol, polyethylene terephthalate or polyamide, which confers on it a low permeability to water. Water is a good heat conductor; if moisture enters the covering 3, this would increase its thermal conductivity and would lower its insulating performance. The at least one layer made of aluminum or polymer also confers a low permeability to air on the covering 3, which makes possible better retention over time of the insulating performance of the vacuum insulation board 1. This is because this permeability makes it possible to retain a low pressure within the covering 3 and thus a low thermal conductivity of the core material 5.

This layer made of aluminum or polymer has to be as thin as possible in order to prevent an increase in the thermal conductivity of the covering 3 as aluminum has a high thermal conductivity of 237 W·m$^{-1}$·K$^{-1}$.

The covering 3 can also be produced from a multilayer film comprising at least one layer made of polymer material on its internal face. This layer made of polymer material makes it possible to hermetically close said covering 3 by heat sealing.

The covering 3 can in particular be produced from a mono- or multilayer film folded over itself, three sides of which are fixed, for example by heat sealing, around the core material 5 in order to form a hermetic covering 3.

The multilayer film forming the covering 3 can, for example, comprise the following layers:

polyethylene/polyacrylic/aluminum/polyethylene terephthalate, or polyethylene/aluminum/polyethylene terephthalate, or also polyethylene/aluminum/polyethylene/aluminum/polyethylene.

FIG. 3 represents a graph showing the change in the thermal conductivity of the air and of an organic aerogel as described above as a function of the pressure. It is thus possible to see that, the lower the pressure, the lower the thermal conductivity also, this being the case whether this is for the air or an organic aerogel. However, on looking at this FIG. 3, it is also noticed that the thermal conductivity of the organic aerogel decreases more rapidly as a function of the decrease in the pressure that the thermal conductivity of the air alone.

Thus, it is advantageous, within the vacuum insulation board 1, to have a core material 5 made of organic aerogel present within the hermetically sealed covering 3 and within which the pressure is between 0.1 and 10 mbar. At this pressure, the thermal conductivity of the insulation board 1 is between 1 and 20 mW·m$^{-1}$·K$^{-1}$.

For its part, FIG. 4 represents a graph showing the change in the thermal conductivity as a function of the pressure for porous materials having different mean pore diameters. Curve A, with an exponential profile, corresponds to the change in the thermal conductivity as a function of the pressure of a material with a mean pore diameter of less than 100 nm, that is to say an organic aerogel as described above. Curve B, with a sigmoid profile, for its part corresponds to the change in the thermal conductivity as a function of the pressure of a material with a mean pore diameter of 10 μm, for example a microporous silica gel commonly used in the prior art.

It is then noticed that, for a pressure of between 0.1 and 500 mbar, the thermal conductivity of the organic aerogel is lower than that of the microporous silica gel. To achieve an equivalent thermal conductivity with the microporous silica gel, it is necessary for the pressure to be even lower.

For this reason, the vacuum insulation board 1 with a core material 5 made of organic aerogel has a superior durability and it can retain these insulation characteristics over time, compared with a vacuum insulation board with a core material 5 made of microporous silica gel. This is because, with time, the pressure within the covering 3 will have a tendency to increase as a result of the permeability, even minimal, of the materials of the covering 3 (of the order of 0.3 gm/m$^2$/day) and of the microleakages. Thus, in the case of a core material 5 made of silica gel, an increase, even minimal, in the pressure increases sooner the thermal conductivity of the vacuum insulation board 1. In the case of a core material 5 made of organic aerogel, a greater increase in the pressure within the covering 3 is necessary in order for the thermal conductivity to significantly increase.

The present invention also relates to a process for the manufacture of a vacuum insulation board 1 comprising the following stages:

A) Preparation of an Organic Aerogel as Core Material 5

This preparation comprises in particular the following stages:

a) polymerization in an aqueous solvent W of polyhydroxybenzene(s) R and formaldehyde(s) F, in the presence of at least one cationic polyelectrolyte P dissolved in said aqueous solvent W and of a catalyst, in order to obtain a solution based on said resin, b) gelling of the solution obtained in a) in order to obtain a gel of said resin, c) drying of the gel obtained in b) in order to obtain said polymeric monolithic organic gel.

An aerogel in the form of a polymeric monolithic organic gel is then obtained.

The preparation of the organic aerogel can also comprise an additional stage d) of pyrolysis of the dried gel obtained in c), in order to obtain a porous carbon.

Advantageously and as indicated above, stage a) can be carried out by using said at least one polyelectrolyte P according to a mass fraction in the composition of between 0.2% and 2%, and/or according to a P/(R+F) ratio by weight of between 2% and 10%, and/or according to a P/(R+F+W) ratio by weight of between 0.3% and 2%.

Also advantageously:
stage a) can be carried out at ambient temperature, by dissolving said polyhydroxybenzene(s) R and said at least one cationic polyelectrolyte P in said aqueous solvent, preferably composed of water, and by then adding, to the solution obtained, said formaldehyde(s) F and said catalyst which can be acidic or basic, then
stage b) can be carried out by curing said solution in an oven.

Mention may be made, as catalyst which can be used in stage a), for example, of acidic catalysts, such as aqueous solutions of hydrochloric, sulfuric, nitric, acetic, phosphoric, trifluoroacetic, trifluoromethanesulfonic, perchloric, oxalic, toluenesulfonic, dichloroacetic or formic acid, or else of basic catalysts, such as sodium carbonate, sodium hydrogencarbonate, potassium carbonate, ammonium carbonate, lithium carbonate, ammonium hydroxide, potassium hydroxide and sodium hydroxide.

Use may be made, for example, in stage a), of an R/W ratio by weight of polyhydroxybenzene(s) to water of between 0.001 and 0.3.

Preferably, stage c) is carried out by drying with air, for example in a stove, without solvent exchange or drying by a supercritical fluid, in order to obtain said polymeric monolithic organic gel which exhibits (according to the conditions of synthesis and in particular the pH) a specific surface of between 400 m$^2$/g and 1200 m$^2$/g, and/or a pore volume of between 0.1 cm$^3$/g and 3 cm$^3$/g, and/or a mean pore diameter of between 3 nm and 30 nm, and/or a density of between 0.01 and 0.4.

It should be noted that this aqueous-phase preparation process according to the invention thus makes it possible to obtain controlled porous structures which vary according to the conditions of synthesis. It is thus possible to obtain a structure of low, solely nanopore, density (i.e., with a pore diameter of less than 50 nm) or else with coexistence between nano- and macropores (i.e., with a pore diameter of greater than 50 nm).

Other characteristics, advantages and details will emerge on reading the following description of several implementational examples of the invention, given by way of illustration and without implied limitation.

Examples of the Preparation of the Organic Aerogel According to the Invention:

The examples which follow illustrate the preparation of two "control" monolithic organic gels G0 and G0' and of five monolithic organic gels according to the invention G1 to G5 and of the corresponding "control" porous carbons C0 and C0' and the porous carbons according to the invention C1 to C5, with the starting reactants:

resorcinol (R) from Acros Organics, 98% pure,
formaldehyde (F) from Acros Organics, 37% pure,
a catalyst (C) composed of hydrochloric acid for the G1 to G4 gels and of sodium carbonate for the G5 gel, and
poly(diallyldimethylammonium chloride) (P), 35% pure (in solution in water W), for the G1 to G5 gels.

These G0, G0' and G1 to G5 gels were prepared as follows:

In a first step, the resorcinol R and the polyelectrolyte P (with the exception of the G0 and G0' gels) were dissolved in a container containing water. Then, after complete dissolution, the formaldehyde F was added. The polymeric solution obtained was adjusted to the appropriate pH with the catalyst C, it being specified that all of these operations were carried out at ambient temperature (approximately 22° C.). In a second step, the solution obtained was poured into Teflon® molds which were subsequently placed in an oven at 90° C. for 24 h in order to carry out the gelling.

The gel was subsequently dried:
in a humid chamber at 85° C. with a moisture content of 90% for 17 hours, in order to obtain the G0', G2, G4 and G5 gels, or
with supercritical $CO_2$ after solvent exchange in a trifluoroacetic acid bath for 3 days and then in an absolute ethanol bath for 4 days, in order to obtain the G0, G1 and G3 aerogels.

Finally, the G0, G0' and G1 to G5 organic gels were pyrolyzed under nitrogen at a temperature of 800° C. in order to obtain the C0, C0' and C1 to C5 porous monolithic carbons.

In table 1 below:
R/F is the molar ratio of resorcinol to formaldehyde,
R/W is the molar ratio of resorcinol to water,
P denotes the mass fraction of polyelectrolyte,
P/(R+F) is the ratio by weight of the polyelectrolyte to the resorcinol-formaldehyde precursors,
P/(R+F+W) is the ratio by weight of the polyelectrolyte to the resorcinol-formaldehyde precursors to which water has been added, and
$CO_2$ sc denotes drying using supercritical $CO_2$, in contrast to the stove drying which can be used according to the invention.

The thermal conductivities of the G0, G2 and G4 gels (see table 2) and of the C0, C2 and C4 porous carbons (see table 3) were measured at 22° C. with a NeoTim conductivity meter according to the hot wire technique, and the mechanical properties in three-point compression and in tension of the G4 gel and of the corresponding C4 porous carbon were measured in comparison with those of a "control" silica aerogel G0" (see table 4) with an MTS tensile/compression testing machine according to the standard ASTM C165-07.

For each C0, C0' and C1 to C5 porous carbon, the specific surfaces, the pore volumes and the mean pore diameters were measured (table 2) using the Tristar 3020 device from Micromeritics.

TABLE 1

| Amounts of reactants/process | G0 | G0' | G1 | G2 | G3 | G4 | G5 |
|---|---|---|---|---|---|---|---|
| R/F | 0.5 | 0.5 | 0.5 | 0.5 | 0.5 | 0.5 | 0.5 |
| R/W | 0.03 | 0.03 | 0.03 | 0.03 | 0.03 | 0.03 | 0.20 |
| P | 0 | 0 | 0.4% | 0.4% | 0.4% | 0.4% | — |
| P/(R + F) | 0 | 0 | 0.0626 | 0.0626 | 0.0640 | 0.0640 | 0.0379 |
| P/(R + F + W) | 0 | 0 | 0.0044 | 0.0044 | 0.0070 | 0.0070 | 0.0127 |
| pH | 3 | 3 | 3 | 3 | 1 | 1 | 6.13 |
| Drying method | $CO_2$ sc | stove | $CO_2$ sc | stove | $CO_2$ sc | stove | stove |

TABLE 2

| Organic gel | G0 | G0' | G1 | G2 | G3 | G4 | G5 |
|---|---|---|---|---|---|---|---|
| Density of the gel | 0.40 | 1 | 0.20 | 0.40 | 0.04 | 0.04 | 0.20 |
| Thermal conductivity of the gel (mW/mK) | 24 | — | — | 26 | — | 24 | — |

TABLE 3

| Porous carbon | C0 | C0' | C1 | C2 | C3 | C4 | C5 |
|---|---|---|---|---|---|---|---|
| Specific surface of the carbon (m²/g) | 983 | 18 | 1014 | 1080 | 769 | 1170 | 670 |
| Pore volume (cm³/g) of the carbon | 0.58 | 0.012 | 0.87 | 0.95 | 0.32 | 0.47 | 0.26 |
| Mean pore diameter (nm) of the carbon | 3.6 | — | 10 | 10 | 5.4 | 4.1 | 3.9 |
| Density of the carbon | 0.40 | 0.90 | 0.20 | 0.40 | 0.04 | 0.06 | 0.20 |
| Thermal conductivity (mW/mK) of the carbon | 30 | — | — | 33 | — | 29 | — |

The comparison of the C0 and C0' "control" porous carbons with those of the invention C1 to C5 clearly shows that the addition of the cationic polyelectrolyte P makes it possible to maintain, for a low density obtained, a nanometric structure even with stove drying (see the specific surface, pore volume and mean pore diameter values of the C2, C4 and C5 porous carbons, which are of the same order as those of C0), whereas, without this polyelectrolyte, the use of drying by supercritical $CO_2$ is necessary in order to retain this nanostructure of the C0 porous carbon.

Under these conditions, the densities of the G1 to G5 gels and of the C1 to C5 nanostructured carbons according to the invention are always less than or equal to 0.4.

By adjusting the pH to 1, these results also show that it is possible to obtain a monolithic material (see the G3 and G4 gels and the C3 and C4 carbons of the invention) with much lower densities (less than or equal to 0.06).

Finally, the results obtained for the G5 gel and the corresponding carbon C5 of the invention show that the synthesis can also be carried out in a less acidic and even slightly basic medium (pH>6).

TABLE 4

| Structure of the gel or of the carbon | G0" Silica aerogel* | G4 Gel | C4 Porous carbon |
|---|---|---|---|
| Density | 0.1* | 0.04 | 0.06 |
| Compression modulus (MPa) | 55* | 800 | 1050 |
| Breaking strength (MPa) | 4* | 25 | 20 |

*according to M.A. Aegerter et al., "*Aerogel Handbook*", *Advances in Sol-Gel Derived Materials and Technologies*, chap. 22.

This table 4 shows that the gels and porous carbons according to the invention exhibit mechanical properties which are very markedly improved in comparison with those of a known silica aerogel.

B) Formation of the Vacuum Insulation Board 1

This formation of the vacuum insulation board 1 is carried out in particular by placing the organic aerogel in a covering 3. The covering 3 can be formed by a multilayer film folded over itself, two sides of which have been bonded to one another, for example by heat sealing, leaving one side open via which it is possible to introduce the organic aerogel.

Subsequently, the pressure within the covering 3 is lowered, for example by means of a vacuum pump, and the covering 3 is hermetically closed, for example by heat sealing. This closure by heat sealing can withstand heat of the order of 180° C. The covering 3 can also be closed by other means known to a person skilled in the art, such as, for example, by soldering, in the case where sides of said covering 3 made of metallic film are in contact, or by adhesive bonding, infrared or ultrasonic welding, and the like.

Thus, it is clearly seen that the vacuum insulation board 1 according to the invention makes possible, as a result of the incorporation as core material 5 of a specific organic aerogel, a better durability over time of these thermal conductivity characteristics, this being the case for a reasonable production cost owing to the fact that the specific organic aerogel does not require a supercritical drying stage.

The invention claimed is:

1. A vacuum insulation board comprising:
   a hermetically closed covering in which the pressure is lower than atmospheric pressure,
   a core material made of organic aerogel placed inside said covering, wherein said organic aerogel comprises a resin produced at least in part from polyhydroxybenzene(s) R and formaldehyde(s) F,
   wherein said organic aerogel is a polymeric monolithic organic gel comprising at least one water-soluble cationic polyelectrolyte, or said organic aerogel is a pyrolysate of said gel in the form of a porous carbon monolith comprising the product of pyrolysis of said at least one water-soluble cationic polyelectrolyte P, and wherein said organic aerogel exhibits a specific thermal conductivity of between 10 and 40 mW·m$^{-1}$·1K$^{-1}$ at atmospheric pressure.

2. The vacuum insulation board as claimed in claim 1, wherein said at least one water-soluble cationic polyelectrolyte P is an organic polymer selected from the group consisting of quaternary ammonium salts, poly(vinylpyridinium chloride), polyethyleneimine, polyvinylpyridine, poly(allylamine hydrochloride), poly(trimethylammonioethyl methacrylate chloride), poly(acrylamide-co-dimethylammonium chloride) and their mixtures.

3. The vacuum insulation board as claimed in claim 2, wherein said at least one water-soluble cationic polyelectrolyte P is a salt comprising units resulting from a quaternary ammonium that is poly(diallyldimethylammonium chloride), poly(diallyldimethylammonium bromide) or another poly(diallyldimethylammonium halide).

4. The vacuum insulation board as claimed in claim 1 wherein the organic aerogel comprises the product of a polymerization reaction in an aqueous solvent W of the polyhydroxybenzene(s) R and formaldehyde(s) F, in the presence of the at least one water-soluble cationic polyelectrolyte P dissolved in said aqueous solvent and of a catalyst.

5. The vacuum insulation board as claimed in claim 4, wherein said product of the polymerization reaction comprises said at least one water-soluble cationic polyelectrolyte P according to a mass fraction of between 0.2% and 2%.

6. The vacuum insulation board as claimed in claim 4 wherein said product of the polymerization reaction comprises said at least one water-soluble cationic polyelectrolyte P according to a P/(R+F) ratio by weight, with respect to said polyhydroxybenzene(s) R and formaldehyde(s) F, which is between 2% and 10%.

7. The vacuum insulation board as claimed in claim 4, wherein said product of the polymerization reaction comprises said at least one water-soluble cationic polyelectrolyte P according to a P/(R+F+W) ratio by weight, with respect to said polyhydroxybenzene(s) R, formaldehyde(s) F and aqueous solvent W, which is between 0.3% and 2%.

8. The vacuum insulation board as claimed in claim 1, wherein the organic aerogel exhibits:
   a specific surface of between 400 m$^2$/g and 1200 m$^2$/g, and/or
   a pore volume of between 0.1 cm$^3$/g and 3 cm$^3$/g, and/or
   a mean pore diameter of between 3 nm and 30 nm, and/or
   a density of between 0.01 and 0.4.

9. The vacuum insulation board (1) as claimed in claim 1, wherein the pressure within the covering is between 0.1 and 500 mbar.

10. The vacuum insulation board as claimed in claim 1, wherein the covering is produced from a film with a thickness of between 20 and 500 μm.

11. The vacuum insulation board as claimed in claim 1, wherein the covering comprises at least one layer made of aluminum.

12. The vacuum insulation board as claimed in claim 1, wherein the covering comprises at least one layer made of polymer.

13. The vacuum insulation board as claimed in claim 1, wherein the at least one layer made of polymer is produced from at least one of one of the following polymers: high- or low-density polyethylene, silicone, polyurethane, ethylene/vinyl alcohol, polyethylene terephthalate or polyamide.

14. The vacuum insulation board as claimed in claim 13, wherein the multilayer film forming the covering comprises the following layers:
   polyethylene/polyacrylic/aluminum/polyethylene terephthalate, or
   polyethylene/aluminum/polyethylene terephthalate, or also
   polyethylene/aluminum/polyethylene/aluminum/polyethylene.

15. The vacuum insulation board as claimed in claim 1, wherein the covering is produced from a multilayer film comprising at least one layer made of polymer material on its internal face.

16. A process for the manufacture of a vacuum insulation board that it comprises:
   preparation of an organic aerogel as core material according to the following stages:
      a) polymerizing in an aqueous solvent W polyhydroxybenzene(s) R and formaldehyde(s) F, in the presence of at least one water-soluble cationic polyelectrolyte P dissolved in said aqueous solvent W and of a catalyst,
      b) gelling of the solution obtained in a),
      c) drying of the gel obtained in b) in order to obtain said polymeric monolithic organic gel,
   placing said organic aerogel in a covering,
   lowering the pressure within the covering and hermetically closing said covering.

17. The manufacturing process as claimed in claim 16, wherein preparation of the organic aerogel further comprises pyrolysis of the dried gel obtained in c), in order to obtain a porous carbon.

18. The manufacturing process as claimed in claim 16, wherein stage a) is carried out by using said at least one water-soluble cationic polyelectrolyte P:
   according to a mass fraction in the composition of between 0.2% and 2%, and/or
   according to a P/(R+F) ratio by weight, with respect to said polyhydroxybenzene(s) R and formaldehyde(s) F, of between 2% and 10%, and/or
   according to a P/(R+F+W) ratio by weight, with respect to said polyhydroxybenzene(s)R, formaldehyde(s) F and aqueous solvent W, of between 0.3% and 2%.

19. The manufacturing process as claimed in claim 16, wherein:
   stage a) is carried out at ambient temperature, by dissolving said polyhydroxybenzene(s) R and said at least one water-soluble cationic polyelectrolyte P in said aqueous solvent W, preferably composed of water, and by then adding, to the solution obtained, said formaldehyde(s) F and said acidic or basic catalyst, and
   stage b) is carried out by curing said solution in an oven.

20. The manufacturing process as claimed in claim 16, wherein stage c) is carried out by drying with air in order to obtain said polymeric monolithic organic gel exhibiting:
   a specific surface of between 400 m$^2$/g and 1200 m$^2$/g, and/or
   a pore volume of between 0.1 cm$^3$/g and 3 cm$^3$/g, and/or
   a mean pore diameter of between 3 nm and 30 nm, and/or
   a density of between 0.01 and 0.4.

21. The manufacturing process as claimed in claim 16, wherein the closing of the covering is carried out by heat sealing.

* * * * *